May 23, 1972 V. A. ZASTROW 3,664,761
TURBINE HOUSING WITH TWO INLET PASSAGES
Filed Dec. 19, 1969 3 Sheets-Sheet 1
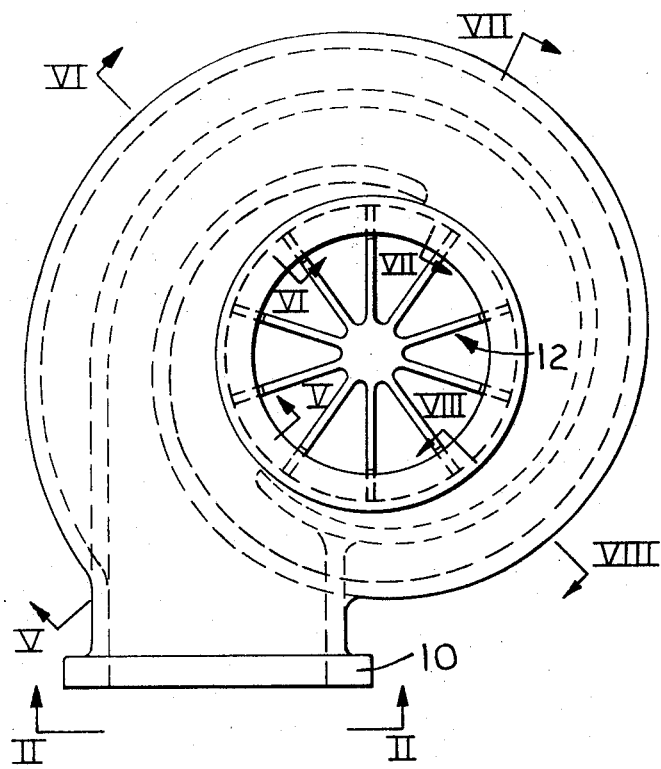
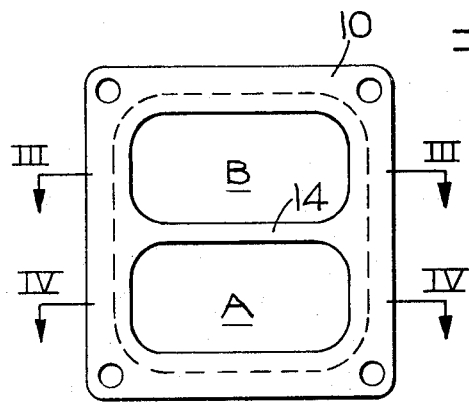
INVENTOR
VIRGIL A. ZASTROW
BY
ATTORNEYS

INVENTOR
VIRGIL A. ZASTROW

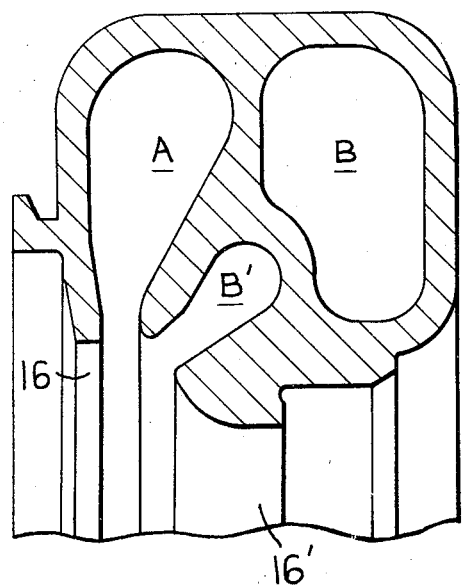
Fig_5_
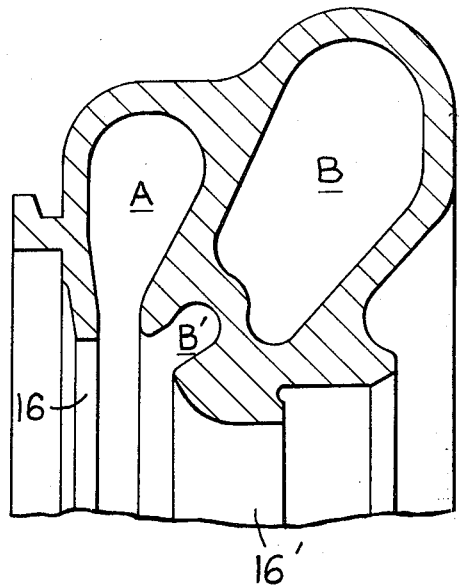
Fig_6_
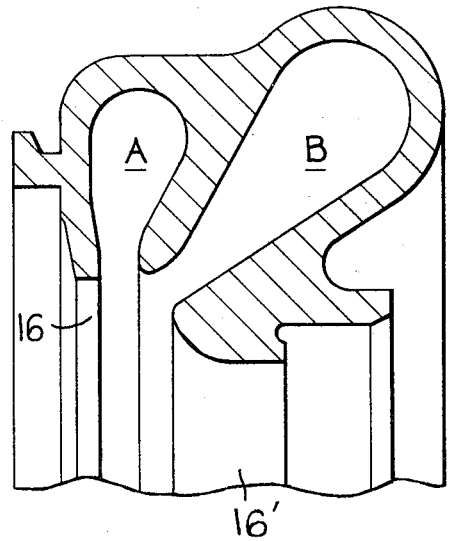
Fig_7_
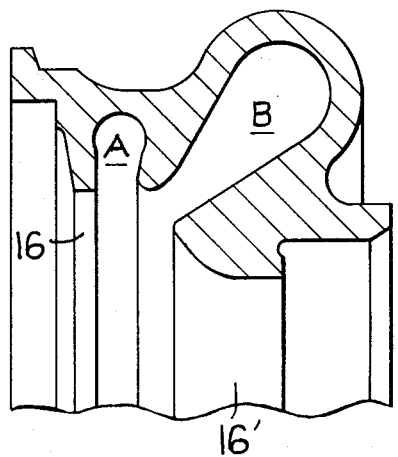
Fig_8_
INVENTOR
VIRGIL A. ZASTROW United States Patent Office 3,664,761
Patented May 23, 1972

3,664,761
TURBINE HOUSING WITH TWO INLET PASSAGES
Virgil A. Zastrow, Edelstein, Ill., assignor to Caterpillar Tractor Co., Peoria, Ill.
Filed Dec. 19, 1969, Ser. No. 886,564
Int. Cl. F01d 1/00; F01k 23/14
U.S. Cl. 415—205
6 Claims

ABSTRACT OF THE DISCLOSURE

A turbine housing with two passages surrounding the turbine rotor of an engine turbocharger with each passage disposed to receive exhaust gases from two different groups of engine cylinders. Each passage is a volute which discharges gas throughout substantially 360° of the rotor circumference and the passages are indexed to cause their discharge openings to be out of phase with each other to reduce imbalance and vibration of the rotor.

---

Twin flow turbine housings are known as evidenced for example by my assignee's patent to Connor, No. 3,270,495. Such housings are employed with divided exhaust manifolds used to direct exhaust from half of an engine's cylinders to one part of the housing and from the other half of the cylinders to the other part of the housing. This tends to prevent overlapping or interference between the impulses caused by discharges of the several cylinders and has produced improved engine performance. However, the housing passage in the Connor patent is a volute and since it has been divided along the center plane which extends through its length, two volutes result which are side by side. In operation a pressure drop is experienced throughout the length of both volutes and since they are coextensive, a pulsating effect is created tending to cause some vibration of the blades of the turbine rotor. Imbalance is also caused which results from the greater pressure occurring on one side of the wheel and this causes wear of the rotor bearings.

According to the present invention, a housing is provided with two passages which are volutes encircling or extending throughout the periphery of the rotor but with each opening toward the rotor at a different angular position about the axis of the rotor. Thus, instead of the most forceful impingement from both volutes occurring at once, they are spaced in time and in distance around the periphery of the rotor. Thus, vibration and undesirable imbalance are greatly reduced.

The invention will best be understood from the following description wherein reference is made to the accompanying drawings.

In the drawings:

FIG. 1 is a view in elevation of the exhaust side of an engine turbocharger power unit in which the configurations of two intake passages constructed in accordance with the present invention are shown in broken lines.

FIG. 2 is a view of the bottom or intake side of the housing shown in FIG. 1 as seen from the plane II—II of FIG. 1.

FIGS. 5, 6, 7 and 8 are sectional views through the housing illustrating the configuration in cross-section of the volutes as viewed respectively from the planes V—V, VI—VI, VII—VII, and VIII—VIII of FIG. 1.

In FIG. 1 of the drawings, a turbocharger housing is illustrated as having a flanged inlet end 10 designed to be bolted or otherwise secured to the outlet end of a divided exhaust housing (not shown). A rotor, indicated at 12, is generally centrally disposed with respect to the housing and volute passages separated from each other by walls such as illustrated in dotted lines in FIG. 1. One such wall is shown at 14 in FIG. 2. These passages serve to direct the exhaust gases from the open end 10 to the periphery of the rotor 12. Simplifications of the configurations of the passages are shown in FIGS. 3 and 4 wherein they are illustrated as passage B in FIG. 3 and passage A in FIG. 4 corresponding to the A and B passages represented in FIG. 2.

Figure 3:
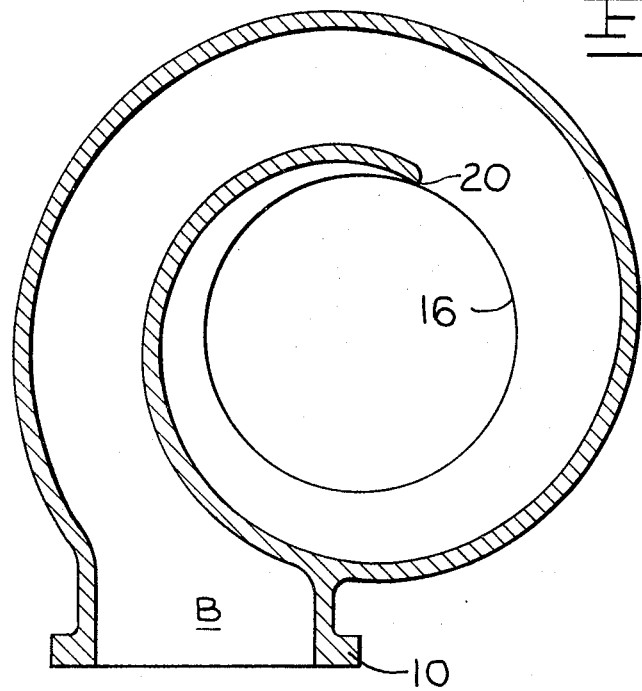
FIGS. 3 and 4 are schematic views, the purpose of which is to illustrate the positions of the two volutes with respect to the periphery of the rotor, the inlet ends of the volutes being taken on the lines III—III and IV—IV respectively of FIG. 2, though the remaining portion of the volutes are distorted with respect to their actual configuration for the purpose of illustration.
Figure 4:
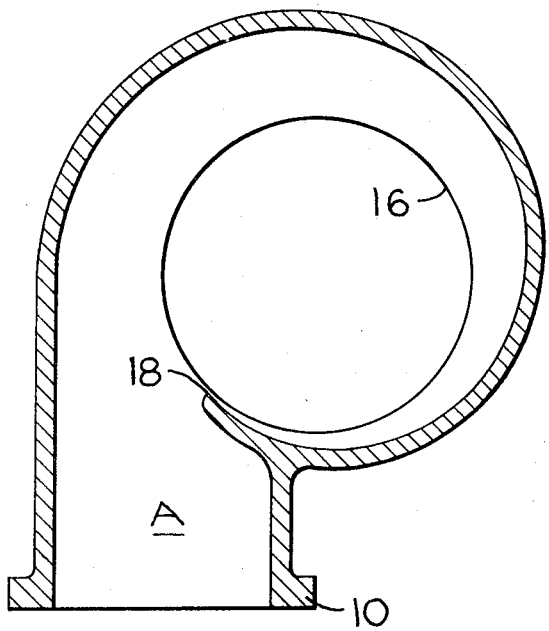

As is best illustrated in FIGS. 3 and 4, each passage conveys gas from the intake end of the housing to the entire periphery of the rotor which occupies the outlet or discharge opening illustrated at 16. As shown in FIG. 4, the passage A opens toward the periphery of the rotor at the point 18 and continues throughout the entire periphery of the rotor terminating at substanially the same point for simultaneous communication with substantially the entire periphery of the rotor. Similarly, the passage B of FIG. 3 opens toward the periphery of the rotor at the point 20 and continues throughout its entire periphery. The divided exhaust manifold with which the passages A and B are associated is constructed to receive exhaust gases of two groups of engine cylinders selected on the basis of their firing sequence in a manner to avoid interference or resonant effects which contribute to vibration of the rotor blades in the turbocharger.

A further important feature of the present design is that the openings of the two passages toward the rotor occur at substanially but not precisely opposite sides of the rotor. In other words, the points of initial entry shown at 18 and 20 in FIGS. 4 and 3 respectively are not diametrically opposed as though they were arranged at a spacing of 180° with respect to each other. Consequently, a further possible cause of vibration is avoided by preventing the heaviest flow of gas in both passages from impinging the blades of the rotor in diametrical opposition.

Since each of the two passages A and B extends throughout the entire periphery of the rotor and since they are coincident and coextensive only with respect to their starting points, they must be divided by walls of irregular configuration such as illustrated by the sectional views represented in FIGS. 5 to 8 inclusive as taken on planes which progress angularly throughout the housing. The periphery of the impeller occupies the annular area bounded by the openings defined at 16 and 16' in these figures and the configuration of the passages at different points throughout the housing are identified by the letters A and B as in FIGS. 2, 3 and 4 with an additional designation B' illustrated in FIGS. 5 and 6 where the sections are taken at planes which intercept the passage B twice which occurs where the outer wall of the passage extends more than 360° about the rotor.

Because the entry points from the passages to the periphery of the rotor are spaced from each other the pressure drop is not additive and again the bearing stresses tend to be more equally distributed.

What is claimed is:
1. A housing for the power rotor of an engine turbocharger;
   said housing comprising walls defining a pair of passages for directing gas to the periphery of said rotor;
   each of said passages comprising a volute chamber encircling said rotor and having a discharge opening encircling said rotor for communicating with said rotor simultaneously about its entire periphery; and the discharge opening of each of said passages being angularly out of phase about the axis of said rotor with respect to the discharge opening of the other passage.

2. The housing of claim 1 in which the discharge openings for communicating with the periphery of the rotor are phased other than 180° with respect to each other.

3. The housing of claim 1 in which the volutes are of different lengths and co-extensive throughout the length of the shorter one.

4. A housing for the power rotor of a turbocharger, said housing comprising:
  walls defining an annular chamber and a pair of volute passages for conveying gases to a turbine blade of said rotor;
  each of said volute passages encircling said rotor and terminating in a discharge opening encircling substantially the entire periphery of said blade for simultaneous communication with substantially the entire periphery of said blade for directing said gases against said turbine blade; and
  said openings are disposed in separate planes along the axis of said rotor and are angularly offset about the periphery of said turbine blade.

5. The invention of claim 4 wherein said openings begin at different points around the periphery of said turbine blade.

6. The invention of claim 5 wherein each of said openings extend throughout the periphery of said blade.

References Cited
UNITED STATES PATENTS

| | | | |
|---|---|---|---|
| 2,390,506 | 12/1945 | Buchi | 415—205 |
| 2,486,732 | 11/1949 | Buchi | 415—205 |
| 3,137,477 | 6/1964 | Kofink | 415—205 |
| 3,614,259 | 10/1971 | Neff | 415—205 |

FOREIGN PATENTS

| | | | |
|---|---|---|---|
| 935,231 | 8/1963 | Great Britain | 415—205 |

HENRY F. RADUAZO, Primary Examiner

U.S. Cl. X.R.

60—13